Figure 3A:
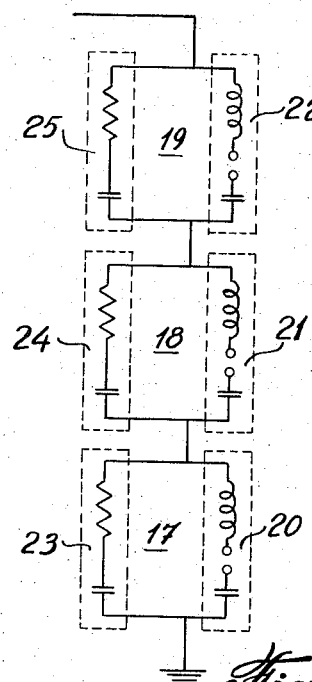

United States Patent
St-Jean

[11] 3,867,686
[45] Feb. 18, 1975

[54] MULTI-FREQUENCY TUNED H.V. SYNTHETIC CIRCUIT FOR TESTING CIRCUIT BREAKERS

[75] Inventor: Guy St-Jean, Longueuil, Quebec, Canada

[73] Assignee: Institut de Recherche de l'Hydro-Quebec (Ireg), Quebec, Canada

[22] Filed: Nov. 12, 1973

[21] Appl. No.: 414,706

[52] U.S. Cl............................. 315 191, 324/28 CB
[51] Int. Cl......................... G01r 31/02, H03k 3/53
[58] Field of Search ....... 324/28 R, 28 CB; 315/191

[56] References Cited
UNITED STATES PATENTS

| | | | |
|---|---|---|---|
| 2,120,873 | 6/1938 | Skeats............................ | 324/28 CB |
| 3,604,976 | 9/1971 | Zajic............................ | 324/28 CB X |

*Primary Examiner*—Alfred E. Smith
*Assistant Examiner*—Rolf Hille

[57] ABSTRACT

The present invention relates to a high voltage generator used for the synthetic testing of high voltage circuit interrupters, and more particularly for a testing circuit of the current injection type, and capable of providing successively an injection currevent wave-form and a transient recovery voltage wave-form. This generator comprises an injection branch providing the injection current wave-form and a regulating branch providing the transient recovery voltage wave-form. The injection branch is formed by at least two groups of elements, each composed of a capacitance, an inductance and a spark-gap in series and forming a unit, this unit being tuned to the same frequency as the other units but not identical to said units and connected in series with the other units forming said injection branch, and each of the units producing the same injection current wave-form by charging its capacitor to a voltage not necessarily the same as that to which the other capacitors are charged. The regulating branch consists of at least two groups of elements, each composed of at least a capacitance and forming a unit, each of the units capable of producing a different transient recovery wave of one or more frequencies. Also, a method for simulating the voltage required in the synthetic testing of interrupters is disclosed.

7 Claims, 13 Drawing Figures

PATENTED FEB 18 1975　　　　3,867,686
SHEET 1 OF 4
PRIOR ART
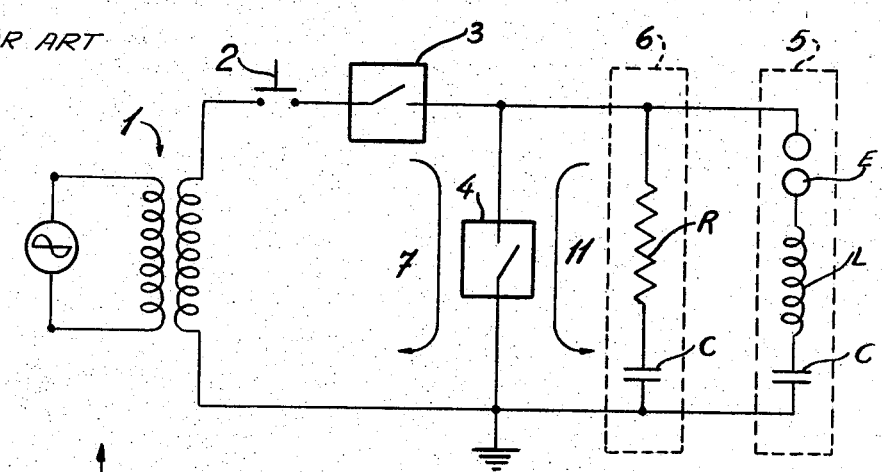
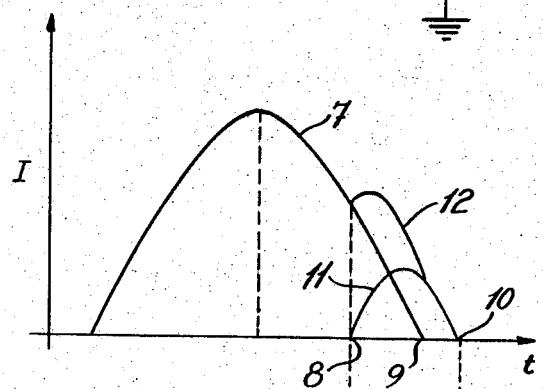
Fig.1
Fig.2A
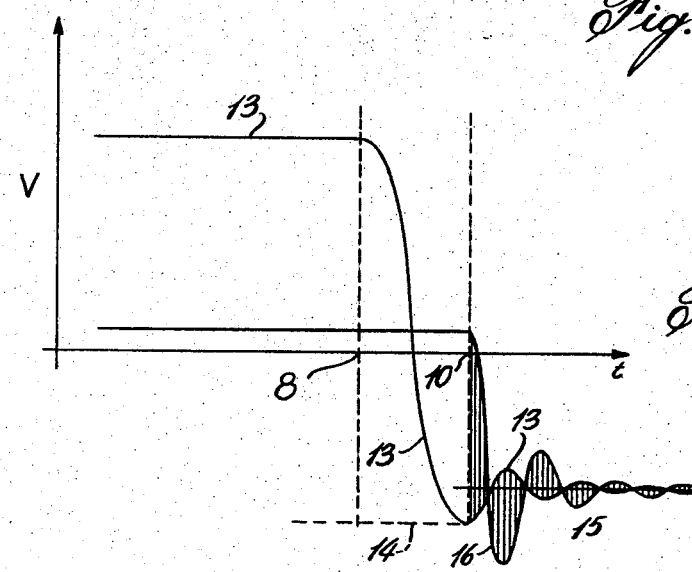
Fig.2B

MULTI-FREQUENCY TUNED H.V. SYNTHETIC CIRCUIT FOR TESTING CIRCUIT BREAKERS

This invention relates to electrical circuits used for testing circuit interrupters, and more particularly to electrical circuits used for testing the breaking capacity of circuit interrupters by the so-called synthetic testing methods.

As is well known in the art, the synthetic testing circuits comprise two circuits: The first one providing, in the interrupter under test, the required current in principle until the time of the opening of the interrupter and is called the high current source, the second one providing the required voltage across the terminals of the circuit interrupter in principle after the interruption of the current and is called the voltage source. In certain known circuits, the operation of the two circuits mentioned above overlap partially in the neighborhood of the passage of the current through zero in such a way that the input of current from the high current source is transferred to the voltage source before the passage of the current through zero. These circuits are known under the name of synthetic testing circuits of the current injection type. The invention relates to the voltage source of such synthetic testing circuits which comprises an injection branch for providing the injection current and a regulating branch for providing the transient recovery voltage.

Hitherto, the injection branch of the synthetic circuits of the current injection type was made up of a concentrated capacitance, a concentrated inductance and a spark-gap or of a group of identical injection branches each being made up of an inductance, a capacitance and a spark-gap, interconnected one another in series or in parallel. The regulating branch comprised concentrated capacitances, resistances and inductances or groups not necessarily identicals of these elements, one group being connected to the other. The number of each of these elements and the design of the final circuit was quite diversified.

These solutions are useful to create simple transient recovery voltage waveforms such as those with two or four parameters. However, these solutions are very expensive owing to the large capacitive energy required to form these waves, especially when the latter have to be very long and, with a steep initial rate of rise. In addition, with circuits consisting of concentrated elements, it becomes extremely difficult to produce precise forms of waves having six parameters or more mainly because of the high complexity of the mutual interaction between the numerous capacitive and inductive elements used.

However, with modular circuits, it is possible to superimpose different individual voltage waves, but this solution is limited and not efficient since it does not permit a choice within each modular circuit of the voltage level and of the elements constituting the injection branch.

The object of the present invention resides in providing an economical circuit able to produce transient recovery voltage waves having a steep initial rate of rise and in a method of producing very complex transient recovery voltage waves.

The high voltage generator in accordance with the present invention is used for the so-called synthetic testing of circuit interrupters and more particularly with a testing circuit of the current injection type capable of supplying successively an injection current wave and a transient recovery voltage wave. This generator comprises an injection branch providing the injection current wave and a regulating branch providing the transient recovery voltage.

The basic idea of the present invention consists in connecting several individual testing circuits in series with the interrupter under test. These circuits each of which comprises an injection branch and a regulating branch will be hereinafter called partial circuits. The configuration of the injection branches of each circuit is the same and comprises an inductance in series with a spark-gap and a capacitance, the capacitance being precharged to a voltage which is not necessarily the same for each partial circuit. The values of the inductance and capacitance of the injection branch of each partial circuit are different.

A common requirement for these injection branches is that each of them must provide the same injected current wave. This means that for sinusoidal currents the frequency and maximum amplitude of the injected currents must be equal. This requirement insures that there is no exchange of energy between these branches during the injection period and that, following the opening of the interrupter, the form of the transient recovery voltage is the sum of the recovery voltages characterizing each of the partial circuits, that is the recovery voltage appearing at the terminals of each regulating branch of each partial circuit.

The configuration of the regulating branch is not necessarily the same for each partial circuit and must include at least a capacitance.

The circuit according to the present invention permits to produce very economically transient recovery voltage waves, especially those which are long and of a steep initial rate of rise. As a matter of fact, conventional circuits have to be greatly damped in order to meet the steep initial rates of rise required. This damping causes a substantial loss of the initial capacitive energy in the damping resistors. The circuit according to the present invention realizes these waves in a much more economical way by using one or more undamped circuits to produce high amplitudes of voltage and the amplitudes required at large time values and by adding a low amplitude wave, which is highly damped and of a steep rate of rise by means of a serially connected partial circuit, thereby meeting the requirements of the initial slope.

Moreover, the circuit is easily adaptable for the formation of complex waves having several frequencies by directly adding more simple waves the amplitude and characteristic frequencies of which are easier to control.

The circuit may be constituted of a one frequency circuit in series with any other circuit. This low voltage single frequency circuit is able to yield the required initial rate of rise of the wave and to cancel completely the damping affecting a circuit at higher voltage and therefore to increase the efficiency thereof, and to increase the efficiency of the circuit as a whole.

The present invention also relates to a method of operating the above-described generator in which the partial circuits may be separated in two serially connected groups, each providing a voltage of opposite polarity. These two serially connected groups may be located on either side of the interrupter under test so as to increase the voltage across the terminals of the interrupter above the insulation level of these groups with respect to ground.

It is to be understood that the present invention also includes the possibility of producing voltages of inverse polarity on any of the above-mentioned arrangements.

Figure 3B:
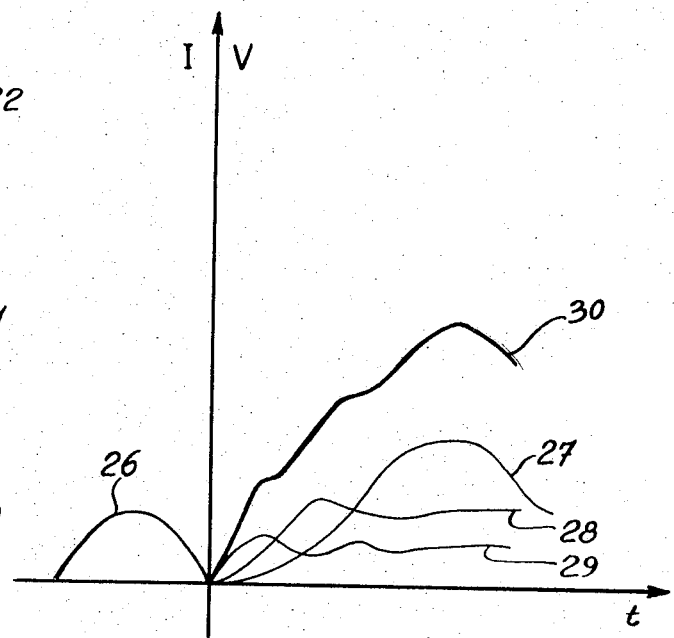

The present invention will be better understood through the description given with reference to the accompanying drawings which illustrate a preferred embodiment of the same, wherein FIG. 1 illustrates a known synthetic circuit made up of a concentrated capacitance, a concentrated inductance and a spark-gap, FIGS. 2A and 2B show the path of the currents and of the voltages respectively in the synthetic circuit of FIG. 1 during test, FIGS. 3A and 3B illustrate the circuit in accordance with the present invention and the corresponding current and voltage waves, FIGS. 4A, 4B, 5A, 5B, 6A and 6B illustrate other embodiments of the present invention together with their corresponding transient recovery voltage waveforms.

Figure 7:
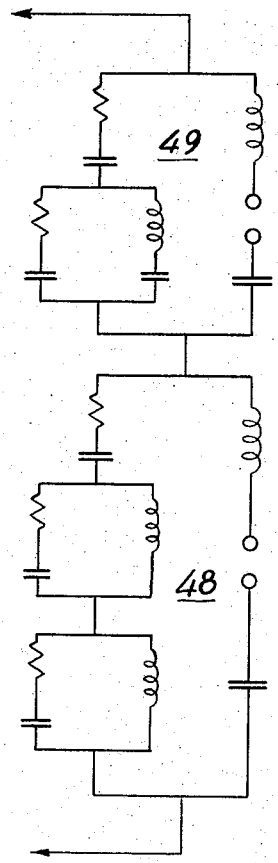
Figure 8:
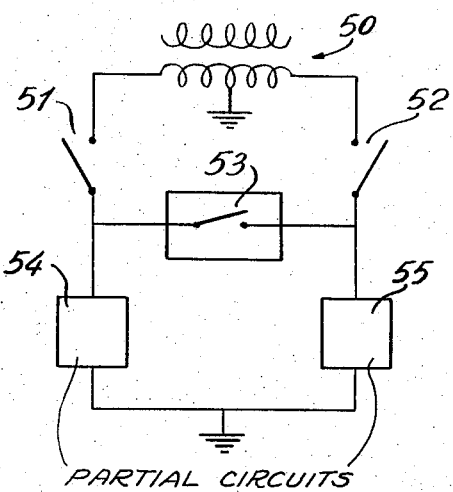

FIGS. 7 and 8 illustrate other embodiments of the generator in accordance with the present invention.

FIG. 1 illustrates a diagram of a conventional synthetic circuit comprising a high current circuit at the industrial frequency composed of a current source 1, a closing switch 2, an auxiliary circuit-breaker 3 and a circuit-breaker under test 4. The current source 1 illustrated here as being a transformer may, of course, be an alternator, a power system, or an oscillating LC circuit providing the industrial frequency current. To the terminals of the circuit-breaker under test is connected a second circuit, called a high voltage source, which comprises an injection branch 5 and a regulating branch 6. In the illustrated example, the injection branch 5 comprises a capacitance C, an inductance L and a spark-gap E in series and the regulating branch 6 comprises a resistor R and a capacitance C also connected in series.

The operation of this simplified circuit is illustrated in FIGS. 2A and 2B in which the current waveforms may be seen on the time axis of FIG. 2A and the voltage waveforms may be seen on the time axis of FIG. 2B. Before starting the test, the current source 1 is energized, the closing switch 2 is open, the circuit-breakers 3 and 4 are closed, and the concentrated capacitance C of injection branch 5 is charged by means of a charger which is not shown. When closing switch 2 is closed, a current at the industrial frequency of 60 Hz starts to flow in the high current circuit. The curve 7 of FIG. 2A illustrates the last half-period of this current before the opening of the circuit-breakers. At a predetermined time before point 8 on the time axis, the contacts of the two circuit-breakers 3 and 4 are opened and two arcs in series are formed in the high current circuit. At point 8 which represents a suitable time before point 9 representing the passage to zero of current 7, the spark-gap E of the injection branch 5 illustrated in FIG. 1 is fired and a second current 11, called the injection current, starts to flow in the injection branch and through the circuit-breaker 4 under test.

The two currents are added in the circuit-breaker 4 to produce the waveform 12 between points 8 and 9 on the time axis, while current 7 only flows through the auxiliary circuit-breaker 3.

The auxiliary circuit-breaker 3 cuts the current waveform 7 at point 9 so that the high current circuit is separated thenceforth from the high voltage circuit. In the time interval 9-10 before the passage to zero of current waveform 11, the current in the circuit-breaker 4 under test is provided by the high voltage source only, that is by the injection branch 5.

In FIG. 2B, which illustrates the voltage path, the D.C. voltage of the concentrated capacitance C in injection branch 5 is shown by the straight portion of curve 13. From point 8 on the time axis, when spark-gap E is fired, until point 10, this voltage is inverted corresponding to the half-period of the injection current 11 due to the oscillating LC circuit of the injection branch 5, so that the voltage of the concentrated capacitance C of the injection branch 5 is given by point 14 at time 10. The voltage on the terminals of circuit-breaker 4 until time 10 was practically zero because, with modern circuit-breakers operating at very high voltages, the arc voltage is only about 1 to 2% of the nominal voltage. At point 10 on the time axis, the injection current loop is opened by circuit-breaker 4 and the regulating branch 6, which was short-circuited by the arc at the terminals of circuit-breaker 4, comes into play. A new oscillating circuit is formed by the injection branch 5 and the regulating branch 6 in series.

The equilibrium of the voltages on the concentrated capacitances C of the two branches gives the oscillations of the transient recovery voltage 16 on the circuit-breaker 4 under test. The transient recovery voltage 16 is superposed on the voltage 13, and the hatched surface 15 between the two curves gives the voltage on the concentrated inductance L of injection branch 5.

In FIG. 3A, there is shown one embodiment of a synthetic circuit in accordance with the invention. By way of example, three partial circuits 17, 18 and 19 with their respective current injection branches 20, 21 and 22 are provided. Each of these branches is made up of a precharged capacitance, an inductance and a spark-gap. It is to be understood that the values associated with the capacitances, the inductances and the charging voltages of said capacitances are not the same for each branch. At the time of the simultaneous firing of each spark-gap in each branch, the three injection branches 20, 21 and 22 are serially connected and in series with the circuit-breaker under test. These branches form, then, the injection branch of the complete circuit.

For avoiding any exchange of energy between the partial circuits during the current injection period, the injection branch of each partial circuit must produce a substantially identical injected current waveform. For the circuit shown in FIG. 3A, this condition is achieved by making the ratio of the inductances of any two partial circuits identical to the inverse ratio of their respective pre-charged capacitances and to the direct ratio of the value of the voltage required to charge each of these capacitances. Thus, during the current injection period, the voltage on the terminals of each precharged capacitor in branch 20, 21 and 22 is inverted as illustrated by curve 13 until it reaches the point 14 (FIG. 2B). At this moment which corresponds to point 10 on the time axis, the arc between the contacts of the circuit-breaker under test is interrupted and the regulating branches 23, 24 and 25, previously short-circuited by the circuit-breaker, are energized. It is to be noted that, because of the identity of the current pulse produced by each partial circuit, each of the partial circuits acts as if it were the only one at the terminals of the circuit-breaker under test, during the current injection period.

Thus, at the moment the arc in the circuit-breaker 4 (FIG. 1) is interrupted, the injection branches 20, 21 and 22 are connected in series with the regulating branches 23, 24 and 25, respectively, and an oscillatory state occurs between said injection and regulating branches in each of the partial circuits 17, 18 and 19. A voltage waveform of the type shown by curve 16 in FIG. 2B is produced at the terminals of each of the regulating branches 23, 24 and 25 (FIG. 3A), since the partial circuits 17, 18 and 19 are one frequency circuits. These circuits, being insulated from one another by means of the opened circuit-breaker 4, act as if they were alone, so that the resulting transient recovery voltage at the terminals of the circuit-breaker 4 is the sum of the individual recovery voltages of each partial circuit.

In FIG. 3B, there are shown the injected current waveform 26, identical for each of the injection branches 20, 21 and 22, the recovery voltage waveforms 27, 28 and 29 respectively from the regulating branches 23, 24 and 25 and the total transient recovery voltage waveform 30 appearing at the terminals of the regulating branches 23, 24 and 25 in series. These branches form the regulating branch of the complete circuit.

Considering the simplified partial circuits 17, 18 and 19 of FIG. 3A, it may be seen that it is possible to vary the amplitude, the frequency and the damping of the transient recovery voltage produced by each partial circuit. In addition, it is to be noted that, according to the identity of the current injection waves, the ratio of the initial capacitive energy of the injection branch of any two partial circuits is equal to the ratio of their respective charging voltages.

Since the cost of high voltage synthetic circuit is mostly related to the amount of capacitive energy used, the undamped high voltage partial circuits connected to low voltage partial circuits, which could be damped, present outstanding advantages in allowing to produce much more economically the desired waveforms.

Figure 4A:
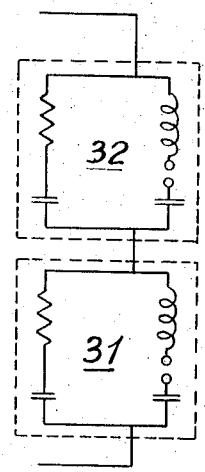
Figure 4B:
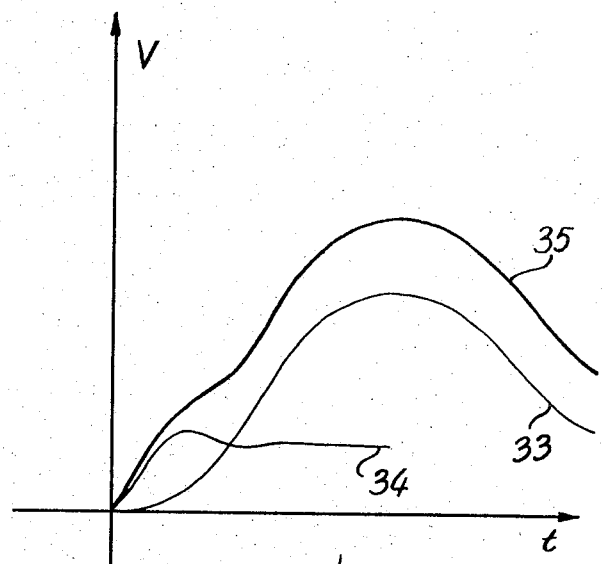

In FIGS. 4A and 4B, there is shown how the use of two partial single frequency circuits for producing a two-parameter wave with an initial steep rate of rise may require only a very small fraction of the capacitive energy necessary for a single frequency circuit To this effect, two partial circuits 31 and 32 are provided each with a similar injection branch and a similar regulating branch. The partial circuit 31 uses the majority of the capacitive energy required and produces an undamped transient recovery voltage wave of high amplitude and low frequency as shown by curve 33 in FIG. 4B in which there is almost loss of the capacitive energy.

The partial circuit 32 which has a low fraction of the capacitive energy produces a voltage wave of low amplitude and high frequency, and sufficiently damped to provide the required initial steepness, and causes energy losses only within this low fraction of the total capacitive energy. This wave is as represented by curve 34 in FIG. 4B. Therefore, the total wave 35 which fulfills the characteristics of a two-parameter wave may be produced with a fraction of the capacitive energy required by a single frequency circuit which has to be highly damped and therefore very lossy on the total capacitive energy. This fraction of energy may be less than ¼ and depends mostly on the shape of wave required.

Figure 5A:
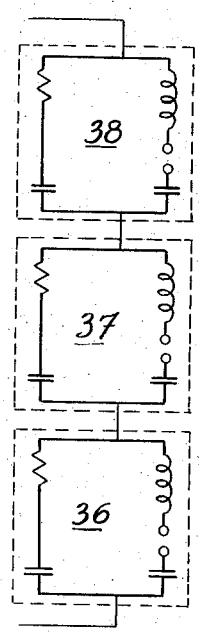
Figure 5B:
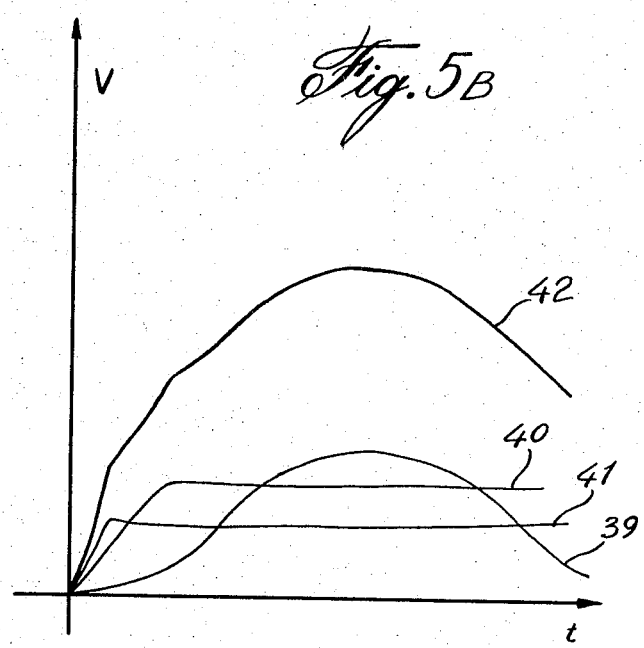

Referring to FIG. 5A, there is illustrated a circuit made up of three partial circuits 36, 37 and 38, each of these being able to produce the same injection current wave, before the interruption, and to produce, respectively, the voltage waves 39, 40 and 41 shown in FIG. 5B after the interruption. The waves 40 and 41 are critically damped so as to produce very simple ramp shapes which allow to produce systematically sudden changes of slope which are often necessary to obtain a required wave shape. The total wave 42 is also shown on FIG. 5B. It is to be noted that the wave 39 which is used to produce the maximum of the amplitude of the total wave 42 is not damped. This is in view of saving the capacitive energy required by circuit 38 producing said wave. Consequently, by the circuit shown in FIG. 5A, it is possible to produce voltage waves which have several changes in their slope.

Figure 6A:
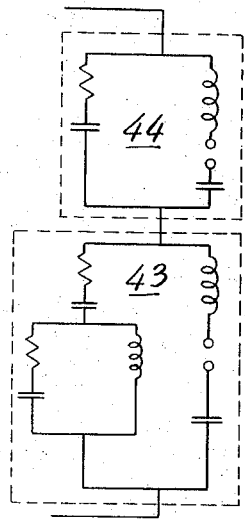
Figure 6B:
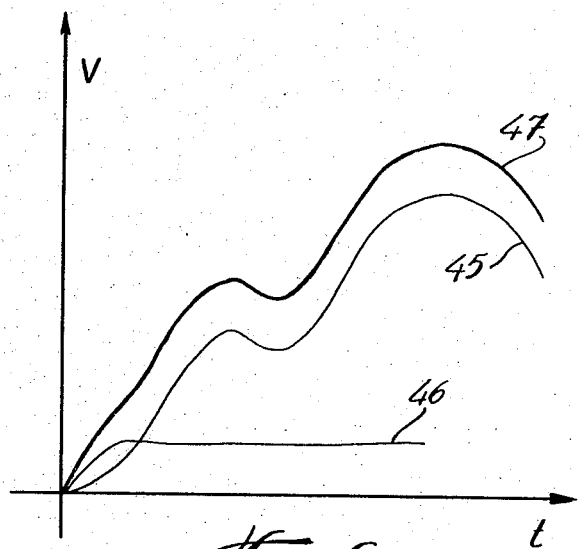

As shown in FIG. 6A, it is possible to produce very economically the steep initial slopes by adding a single frequency circuit 44 in series with any standard circuit 43. The total wave provided by this combination is represented at 47 in FIG. 6B and is the result of the addition of wave 45 and wave 46 produced by circuits 43 and 44, respectively. It is to be noted that the energy and voltage level of the elements composing the circuit 44 may be only of a very small fraction of the values corresponding to the elements of the standard circuit 43. Also, the circuit 44 is for that reason more compact.

As shown in FIG. 7, it is also possible to combine several multi-frequency circuits such as 48 and 49 to obtain the required waveforms.

Another use of the generator is illustrated in FIG. 8. There is illustrated a synthetic testing circuit whereby it is possible to test circuit-breakers having rated voltages that are higher than the insulation level of the partial circuits. The high current circuit is composed of a source 50 at the industrial frequency, of two auxiliary circuit-breakers 51 and 52 and of a single circuit-breaker under test 53, having a rated voltage which is higher than the voltage of circuit-breaker 51 and 52. Two partial circuits 54 and 55, of any type mentioned above, the first one being charged with a positive potential, the second one being charged with a negative potential, are used. At a suitable time before the passage of the high current through zero, exactly as illustrated in FIG. 2A, the spark-gaps in the two circuits 54 and 55 are triggered and an injection current 11 (FIG. 2A) is circulated in circuit-breaker 53 by the two circuits in series. The interruption of the current in the circuit-breaker under test is exactly the same as in FIG. 2A. After the interruption of the current, the two partial circuits each produce a transient recovery voltage wave. The waves are different, have a different polarity and are superimposed across the terminals of the circuit-breaker under test, because of the advantage of being able to choose the value of the charging voltages for series connected tuned partial circuits.

In concluding this description, the following advantages may be mentioned concerning the generator in accordance with the invention:

1. By the application of the basic idea of the present invention, there is obtained a synthetic testing circuit which permits to produce predetermined injection current waves and transient recovery waves with a substantial economy of the capacitive energy required when compared to conventional circuits.

2. By the application of the basic idea of the present invention, there is obtained a synthetic testing circuit which offers a systematic way of providing, very economically, very complex transient voltage waveforms and of reducing the need of randomly adjusting the elements.

Although the invention has been disclosed with reference to a preferred embodiment, it is to be understood that various modifications may be made thereto within the ambit of the invention which is to be determined from the accompanying claims.

I claim:

1. A high voltage generator used for the synthetic testing of high voltage circuit interrupters, and more particularly for a testing circuit of the current injection type, and capable of providing successively an injection current wave-form and a transient recovery voltage wave-form, comprising:
   a. a plurality of partial circuits connected in series, said partial circuits including:
      1. an injection branch having an inductance, a precharged capacitor, and a spark-gap, all in series, and
      2. a regulating branch having at least a capacitance, connected in parallel with said injection branch;
   b. each partial circuit injection branch having a tuned resonant frequency equal to the product of the inductance and capacitance included therein, said product being identical to the product of the total injection branch comprising said series combination of partial circuit injection branches.
   c. at least some of said inductances in said partial circuit injection branches being unequal to other inductances therein.

2. A high voltage generator as described in claim 1 wherein the ratio of the inductances of any two partial circuit injection branches is the reciprocal of the ratio of the respective capacitances therein.

3. A high voltage generator as described in claim 1 wherein the ratio of the voltages to which said capacitors are charged in any two partial circuit injection branches is the reciprocal of the ratio of the respective capacitances.

4. A high voltage generator as described in claim 1 wherein each partial circuit produces a transient recovery voltage wave-form of at least one characteristic frequency.

5. A high voltage generator as described in claim 1, comprising two non-identical groups of distinct partial circuits, said groups charged by different voltages of opposite polarities and in series with a high current source through separate auxiliary circuit breakers, wherein the circuit interrupter under test is connected between terminals of opposite polarities of each group thereby providing a testing voltage on the interrupter which is greater than the voltage of either of said groups.

6. A method of simulating the required power for the synthetic testing of high voltage circuit interrupters using a high voltage generator including a plurality of partial circuits capable of providing successively an injection current wave-form and a transient recovery voltage wave-form, each partial circuit comprising an injection branch and a regulating branch, said injection branch having an inductance, a precharged capacitance and a spark-gap, all in series, at least some of said inductances in said partial circuit injection branches being unequal to other inductances therein, said regulating branch having at least a capacitance, said method comprising the steps of:
   a. providing the required power by triggering the spark-gaps of the various partial circuits;
   b. causing each partial injection branch to provide an identical injection current wave-form to the interrupter under test;
   c. providing a transient recovery voltage wave-form by superimposing on the interrupter under test a plurality of voltage wave-forms each of at least one characteristic frequency.

7. The method of synthetic testing of high voltage circuit interrupters as described in claim 6 including the steps of charging the capacitance in each injection branch to a voltage inversely proportional to said capacitance, the constants of proportionality for all said branches being the same, for the purpose of providing an identical current Wave-form from each of said injection branches.

* * * * *

UNITED STATES PATENT OFFICE
CERTIFICATE OF CORRECTION

Patent No. 3,867,686          Dated February 18, 1975

Inventor(s)   GUY ST-JEAN

It is certified that error appears in the above-identified patent and that said Letters Patent are hereby corrected as shown below:

In the ASSIGNEE'S name:

"Ireg" should read "IREQ".

IN THE ABSTRACT:

Line 5, "currevent" should read -- current --.

IN THE SPECIFICATION:

Column 5, line 55, "almost loss" should read -- almost no loss --;

Column 7, line 30, "equal to" should read -- that equates to --.

Signed and Sealed this twenty-second Day of July 1975

[SEAL]

Attest:

RUTH C. MASON
*Attesting Officer*

C. MARSHALL DANN
*Commissioner of Patents and Trademarks*